(12) United States Patent
Perry et al.

(10) Patent No.: US 8,448,334 B2
(45) Date of Patent: May 28, 2013

(54) FORMING SELF-HEALING INSULATION FOR MAGNET WIRE

(75) Inventors: Thomas A. Perry, Bruce Township, MI (US); Anil K. Sachdev, Rochester Hills, MI (US); William R. Rodgers, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 568 days.

(21) Appl. No.: 12/645,671

(22) Filed: Dec. 23, 2009

(65) Prior Publication Data

US 2011/0147043 A1 Jun. 23, 2011

(51) Int. Cl.
*H01B 19/00* (2006.01)

(52) U.S. Cl.
USPC ......... 29/887; 29/33 F; 29/602.1; 174/120 R; 174/138 C

(58) Field of Classification Search
USPC .............. 29/33 F, 825, 887, 596, 602.1, 605; 174/110 R, 116, 119 C, 120 R, 138 C, 140 C; 310/201, 208; 428/383; 523/211, 212; 385/100
See application file for complete search history.

(56) References Cited

U.S. PATENT DOCUMENTS

| 5,587,619 | A | * | 12/1996 | Yumiyama et al. | ........... 310/208 |
| 7,285,306 | B1 | | 10/2007 | Parrish | |
| 7,302,145 | B2 | * | 11/2007 | Huston et al. | ................. 385/100 |
| 7,723,405 | B2 | * | 5/2010 | Braun et al. | .................. 523/212 |

* cited by examiner

*Primary Examiner* — Donghai D. Nguyen
(74) *Attorney, Agent, or Firm* — Reising Ethington P.C.

(57) ABSTRACT

A process for remediating the insulating properties of magnet wire insulation is described. Magnet wire, used in electric motors and other electrical devices, comprises an electrically-conductive core covered by a thin insulating layer. The insulating layer may be damaged or compromised during manufacture or service. A process for incorporating polymerizable materials, sequestered in microcapsules, within the insulating layer is described. When the insulating layer is subjected to conditions sufficient to compromise its insulating character, the microcapsules fracture and release their contents which then polymerize and re-establish the insulating properties of the layer.

11 Claims, 4 Drawing Sheets

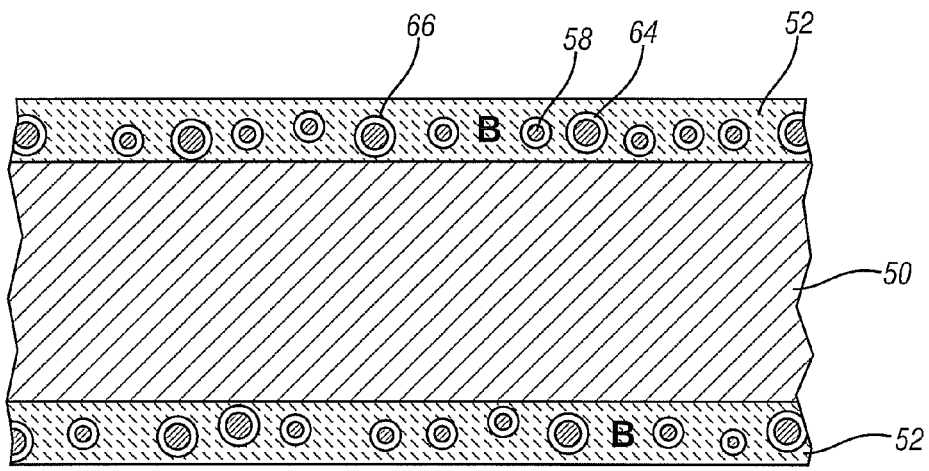
FIG. 6
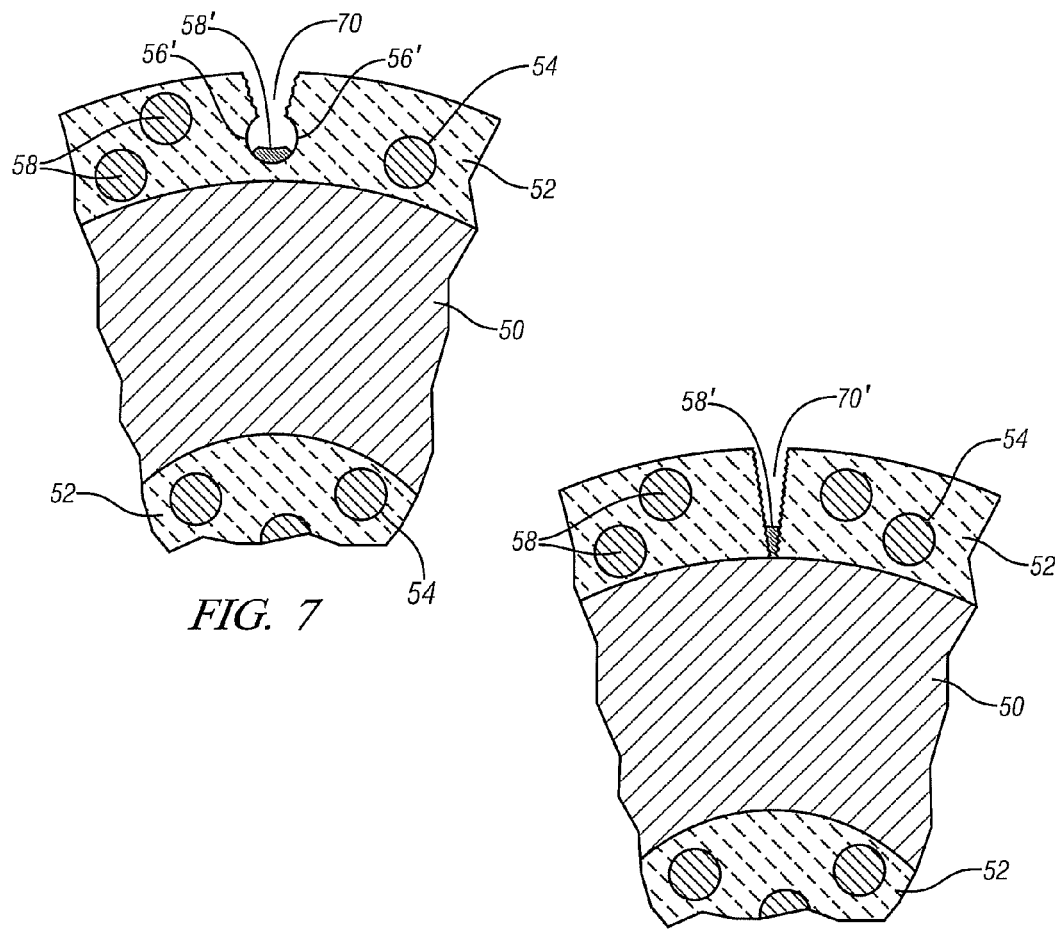
FIG. 7
FIG. 8

FORMING SELF-HEALING INSULATION FOR MAGNET WIRE

TECHNICAL FIELD

This invention pertains to the development of insulating coverings for electrical conductors, particularly for copper conductors used in electrical motors. The insulating coverings incorporate encapsulated chemical species capable of regenerating an electrically-insulating coating on the wire should the initially-applied coating be nicked, ruptured, or otherwise undergo damage which reduces its insulating capability.

BACKGROUND OF THE INVENTION

Electric motors operate through the interaction of opposing magnetic fields associated with a stationary element, a stator, most frequently generally resembling a hollow cylinder and a generally cylindrical rotating element, a rotor, whose axis lies on the axis of the stator. Either or both of these magnetic fields may be electrically generated by the passage of current through an electrical conductor.

More generally, multiple conductors are used, with the conductors configured to produce additive interaction of their individual magnetic fields.

These magnetic fields interact most effectively and generate maximum motor torque when shaped and focused by confining the cooperating conductors within a prescribed region carried on a low reluctance material such as an iron-based alloy. It will be appreciated that the conductors and their supporting low reluctance structure may be configured such that they constitute a rotor or a stator depending on the motor type.

A convenient way to shape the magnetic field of a stator or a rotor is to position the cooperating conductors in one of a plurality of slots radially distributed about the cylinder axis and extending along its length. The volume of the slot obviously limits the volume of electrical conductor which can be accommodated but other factors such as the form of the conductor are also important. For example, randomly-wound conductors with circular cross-section will not generally fill the slot cross-section as efficiently as placed or positioned conductors of square, rectangular or other parallel-sided cross-sections.

Yet further limitation results from the need to have the conductor loops insulated from one another and from the stator frame. Each conductor is coated with an electrically-insulating medium which beneficially electrically isolates it from its neighbors but increases conductor separation and hence limits the number of conductors which may be employed for any given slot dimension. There is therefore incentive to reduce insulation thickness as far as practicable.

Coating thicknesses may range from about 0.001 to 0.010 inches (about 0.025 to 0.25 millimeters) depending on the operating conditions of the motor and the dimensions of the conductor. These coatings are designed to afford good adherence to the conductor and to exhibit no cracks or exposed conductor at the conclusion of the motor manufacturing processes.

Nonetheless the combination of extensive handling and processing to which the conductor is subjected during motor manufacture, coupled with the thinness of the insulating coating can lead to rupture of or damage to the coating. Eventually such damage may lead to insulator breakdown, initiating short-circuits between adjacent conductors or between a conductor and the stator frame and resulting in the need for motor repair.

Thus, it would be advantageous if the dielectric properties of the insulation could be restored if the performance of the primary insulation is compromised Further, in service, all motors are subject to 'self-forces' which arise from the interactions of the induced magnetic fields. These forces are applied to all current-carrying elements of the motor, including the windings. These forces promote relative movement of the individual windings and can lead to rubbing or fretting which eventually leads to insulation breakdown. Generally, provision is made to secure the windings and prevent their relative movement by tying the windings together or by encasing the windings in an at least somewhat rigid material such as epoxy or varnish or both in combination. However the magnitude of the forces, particularly in high current traction motors, all but assures that some conductor rubbing will occur.

Thus, for this reason also, it would be advantageous to automatically restore the dielectric properties of the insulation if the performance of the primary insulation is compromised.

SUMMARY OF THE INVENTION

Magnet wire electrical conductors may be formed in different cross-sectional and length-wise shapes for use in electrical devices such as coils, solenoids, transformers, generators and motors. The conductors are often extruded to obtain a desired cross-section. Long coils or shorted shapes may be fowled. At some stage in their manufacture the conductors are coated with a thin liquid layer of electrical insulating composition (often polymeric) which is then dried or cured to obtain a suitable level of electrical resistance to prevent electrical shorting in an assembled electrical device. However, it is often necessary to wind the magnet wire on a rotor or stator or otherwise shape it for placement in a magnet wire-supporting body assembly. Such shaping of the magnet wire may stress the hardened insulation layer and produce small cracks or other defects that impair its electrical resistance. This invention provides self-healing coatings for magnet wires that can repair such defects in the electrical insulation.

In embodiments of this invention, polymerizable materials, sequestered in microcapsules, are dispersed in suitable, commonly-used insulating materials and applied by immersing the magnet wire in the dispersion or by other suitable wire coating processes. The microcapsules are designed to ensure that rupture of the microcapsules or release of the polymerizable materials does not occur during application of the insulating layer. However the microcapsules are composed to rupture under conditions which promote damage to the insulating layer. The microcapsules are smaller than the applied thickness of the polymer insulation layer and dispersed in sufficient quantity to supply sufficient polymerizable repair material to seal a crack or small rupture in an insulating layer protecting a conductor.

A variety of encapsulates may be employed including some like linseed oil or tung oil which polymerize on exposure to oxygen; some such as isocyanate which polymerizes on exposure to water or water vapor; and some, such as isocyanate which respond to a separately stored initiator or crosslinking agent such as an amine. Further external polymerization initiators such as ultraviolet (UV) light may be employed at least during the bending manufacturing process of these wires. In some embodiments of the invention, the insulation-coating may be heated, subjected to UV radiation, or the like after the wires have been stressed in the assembly of their motor or the like. Such processing may be undertaken with or without actual testing of the insulation. The timing of this process is to induce self healing of a stressed, and possibly damaged, magnet wire insulation layer before the electrical device is approved for use or put into use. In other embodiments of the invention, the insulation material, with its capsules of self-healing polymeric material may composed of catalysts or the like to repair later induced damage after the device has been put to its intended use.

It is intended that the microcapsule be suitably attached to the insulation, either by chemical bonding or by mechanical interlock. Thus any mechanical loading experienced by the insulation and capable of damage to the insulation will be transmitted to the capsule, causing it to rupture and release its contents. Suitable microcapsule shell materials are polyurethane, polyurea, epoxy or silicaceous material including glass. Polymer shells may be produced using interfacial polymerization methods and silicaceous shells using sol-gel approaches. Combination microcapsule shell structures comprising a polyurethane, polyurea or epoxy interior shell with an outer glass or silicaceous shell are also suitable.

Preferably the microcapsule contents are flowable and polymerize at a rate suitable for permitting the microcapsule contents to flow and fill any break in the insulating coating before polymerizing and permanently reforming the insulating layer and restoring its insulating properties. It will be appreciated that the strength of the microcapsule should be comparable to the strength of the insulating coating so that rupture or damage to the insulating layer sufficient to degrade its insulation properties is required to rupture the microcapsules. Clearly a microcapsule whose shell strength is appreciably greater than that of the insulating material is not preferred since it may not rupture in response to damage to the insulating layer and cannot therefore remediate the insulation at the damage location. Use of a capsule with a shell strength appreciably less than the strength of the insulating layer however is also not preferred since the microcapsule may release and expend its contents in response to only minor deformation so that remediation of a later, more severe, deformation is compromised.

Thus the capsules should satisfy two constraints: first, that they confine the polymerizable material unless ruptured; and second, that they exhibit a specified strength relative to the insulating material in which it is embedded. These requirements may be satisfied by a microcapsule with a shell comprising a single material or by a microcapsule comprising more than one shell material or layer. Further, the quantity of microcapsules dispersed in an insulating film is suitable for releasing sufficient quantity of their flowable, polymerizable contents to seal and fill small breaks in the insulating film and to thereby restore at least some insulating function at the break.

BRIEF DESCRIPTION OF THE DRAWINGS

FIG. 6 shows, in cross-section, a portion of magnet wire with insulation comprising double shell microcapsules containing a polymerizable material.

FIG. 7 shows, in cross-section, a portion of the magnet wire and associated microcapsule-containing insulating layer shown in FIG. 5 after bending the wire to an extent sufficient to promote a V-shaped crack in the insulating layer and to rupture a microcapsule.

FIG. 8 shows, in cross-section, another portion of the crack of FIG. 7. In this portion, the crack does not encounter a microcapsule and originally propagated to the insulation-wire interface. Once formed, the crack partially filled with polymerizable material released by a fractured microcapsule, such as that shown in FIG. 7, located above or below the viewed section.

DESCRIPTION OF PREFERRED EMBODIMENTS

Electric motors with ratings of 80 HP to 170 HP are becoming increasingly important as drive motors in automobiles, either individually or in combination with an internal combustion engine.

Such electric motors generally employ low resistance conductors, typically in the form of wire of round, square or rectangular cross-section positioned in narrow channels provided in structures fabricated from low reluctance materials. Copper conductors are preferred but aluminum may also be employed. These copper conductors, coated with a thin layer of insulating material and more commonly referred to as magnet wire, are provided to a motor manufacturer in extended lengths and generally packaged as a compact coil wrapped around a cylindrical spool or bobbin. The wire is then unwrapped from the spool or bobbin before undergoing additional processing to fabricate forms suitable for electric motor application and is then installed in either the rotor or the stator, or both, of an electric motor.

Figure 1:
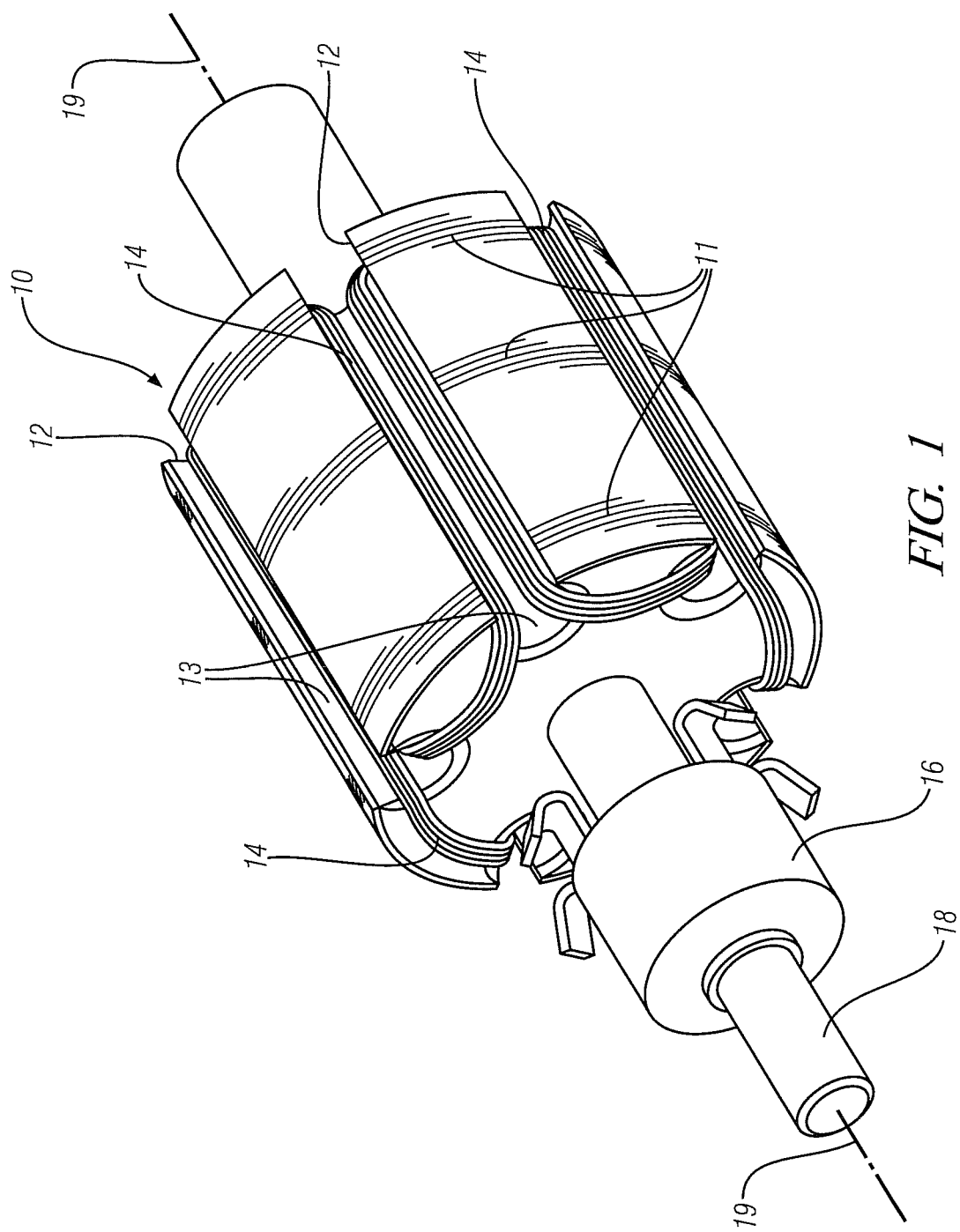
FIG. 1 shows a motor rotor incorporating wound coils for development of shaped magnetic fields.
Figure 2:
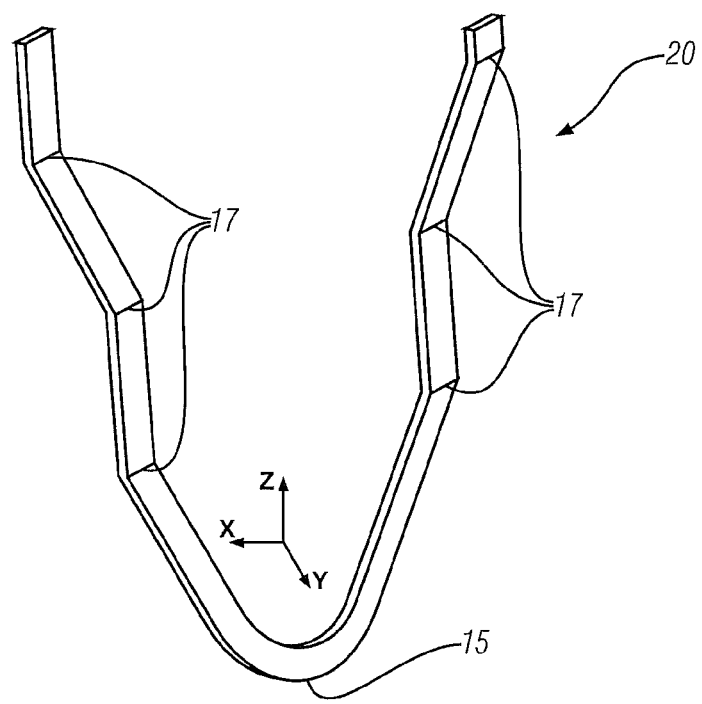
FIG. 2 shows a first example of a hairpin conductor suitable for use in a motor stator.
Figure 3:
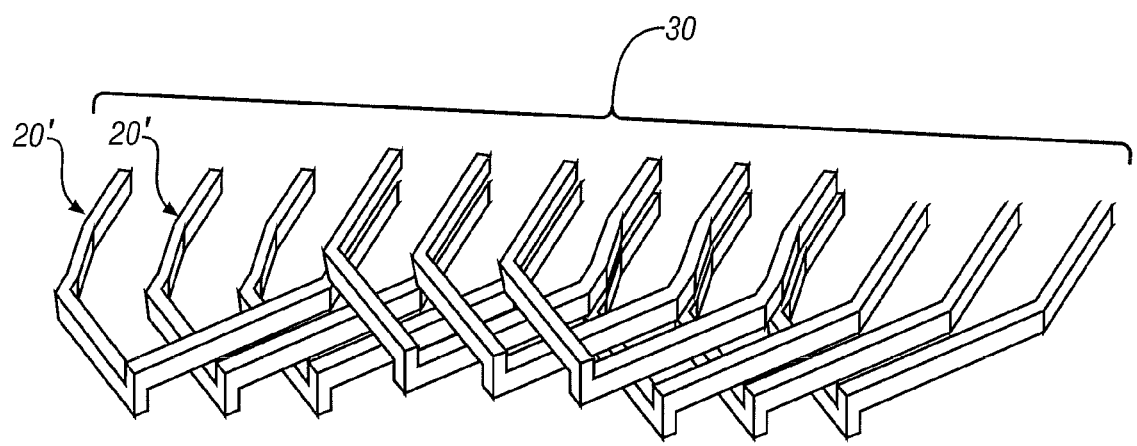
FIG. 3 shows a plurality of second examples of hairpin conductors suitable for use in a motor stator laid out and arranged as they will be inserted into a stator frame.
Figure 4:
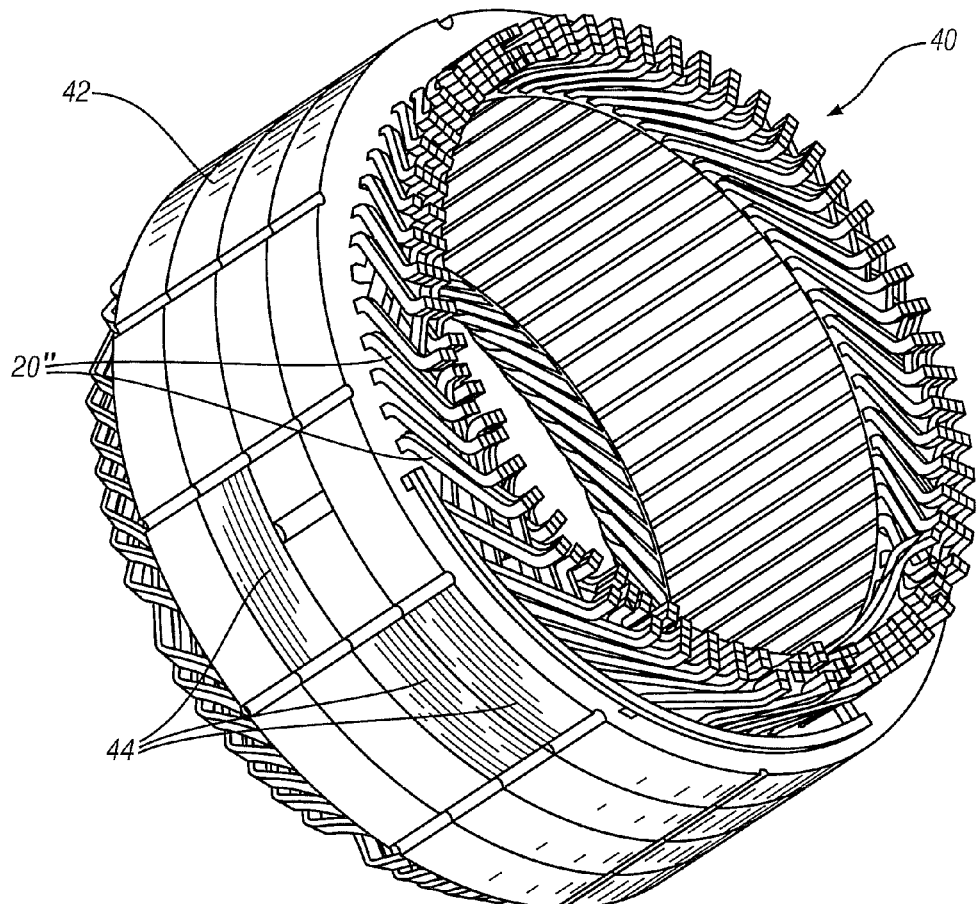
FIG. 4 shows an assembled motor stator comprising a stator frame and a plurality of yet third examples of hairpin conductors assembled into the frame.

For example the wire may be wound in the form of a coil suitable for installation on a rotor as illustrated in FIG. 1. Here rotor 10 comprised of a stack of laminations, for clarity indicated in part only at 11, incorporates a series of slots 12 each of which accommodate parallel legs of generally rectangular coils 14 insulated from laminations 11 by insulating sleeve 13. Electrical connections to coils 14 (details not shown) are generally made through a slip-ring or commutator or similar device 16 depending on motor type mounted coaxially on shaft 18 which supports the rotor as it rotates about axis 19. Another approach, illustrated in FIGS. 2, 3 and 4 shows the use of short lengths of formed and bent magnet wire to develop a desired conductive path, as depicted here, in a stator. Examples of these short lengths of conductor, generally described as hairpins are shown as a first exemplary hairpin 20 (at FIG. 2), in multiples 30 of a second exemplary hairpin 20' (at FIG. 3), while an assemblage of yet third exemplary hairpins 20" are shown inserted into a stator frame 42 comprising an assemblage of laminations 44 (shown in FIG. 4). When the plurality of hairpins 20" is welded together to form a continuous electrically conductive path, they form a stator 40 (at FIG. 4). The nature of the current path and hence the mode of connecting the hairpins will depend on the nature of the motor and, for AC motors, whether it is single-phase or three-phase. These and other considerations and approaches for manufacture of electric motor elements are well known to those skilled in the art.

All of the motor manufacturing processes impose at least some deformation on the magnet wire. Typically the wire will be both stretched and bent, imposing considerable demands on the insulating film to maintain its dielectric character. For example, location 15 on hairpin 20 has undergone considerable bending about the 'y-axis' in the 'xz plane' while locations 17 on hairpin 20 have experienced bending about the 'x-axis' in the 'yz plane'. For reference, the undeformed wire will lie in the 'xz-plane'.

This is well known, and standard test and evaluation procedures, the best-known and most-cited of which are due to the National Electrical Manufacturers Association or NEMA, have been developed for evaluating the performance of magnet wire after it has been subjected to processes at least suggestive of manufacturing procedures. For example, a NEMA requirement calls for visual evaluation of the insulating coating after at least extending the wire by a prescribed amount and, for most wire gages, also wrapping the wire around a mandrel of diameter several times the wire thickness. No cracks or exposed conductor should be observed.

Nonetheless with the volume of magnet wire and motors produced, deficiencies in the dielectric properties of the magnet wire resulting from current manufacturing processes may occur. In current practice, it is common, particularly in wound coil electric motors to apply and infiltrate an insulating varnish around and between the windings. The varnish serves both to supplement the existing insulation and to impart mechanical strength to the conductor assembly and may be applied in a number of ways including by dipping a motor element in a varnish bath, by trickling a continuous flow of varnish over the motor element or by vacuum impregnation. Once applied, the varnish is cured, and the desired mechanical and electrical strength is globally imparted to the winding albeit at significant expenditure of energy and time.

Figure 5:
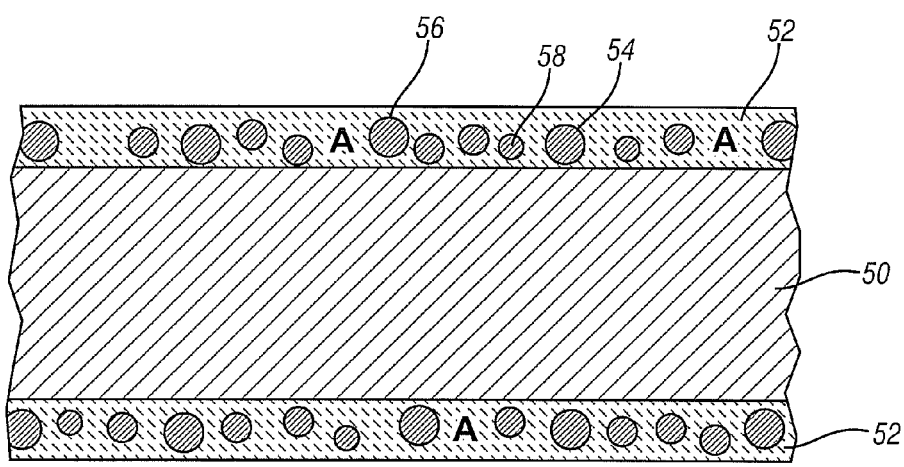
FIG. 5 shows, in cross-section, a portion of a magnet wire with insulation comprising single shell microcapsules containing a polymerizable material.

It is the intent of this invention to selectively remedy any dielectric deficiencies occurring either during motor manufacture or use. Hence microcapsules containing flowable and polymerizable dielectric material are incorporated in the magnet wire insulation as shown schematically in fragmentary cross-section in FIGS. 5 and 6. Here a portion of conductor, such as for example the hairpin 20 of FIG. 2 is shown in cross-section. In FIG. 5 the conductor 50 is coated with a thin insulating layer 52 which contains a preferably uniform dispersion of microcapsules 54 preferably of generally constant size, each microcapsule comprising a single shell 56 encapsulating a polymerizable material 58. In FIG. 6, conductor 50 is shown coated with a thin insulating layer 52 which again contains a distribution of preferably uniform size microcapsules 64. Here the capsules comprise two shells, one typically a polymer and the other typically a glass, collectively indicated as 66 encapsulating polymerizable material 58 In reviewing FIGS. 5 and 6, it will be appreciated that the view shown depicts a section through a population of microcapsules and thus shows the concentration of capsules in a plane. Thus, the local absence of microcapsules in specific areas such as are marked 'A' in FIG. 5 or 'B' in FIG. 6 should not be interpreted as implying that no remediation may be achieved if coating rupture occurs at these locations. Rather as will be described in greater detail subsequently, remediation will be accomplished by microcapsules located out of the plane of the section and lying either above or below the sectioned plane.

The microcapsules are to be at least partially mechanically-coupled to the magnet wire insulation so that the stresses imposed on the insulation are efficiently transmitted to the capsule shell. The capsule, on being subjected to some predetermined critical stress, is designed to rupture and release its contents. Preferably the capsule strength will be only slightly less than the rupture stress of the insulating layer so that capsule rupture will anticipate film rupture to only a limited extent. After release, the capsule contents will then polymerize, reforming the insulating layer and remedying any deficiencies in the dielectric strength of the magnet wire insulation. Suitable encapsulates include tung oil or linseed oil, which, on exposure to air, absorb oxygen to form hydroperoxides which then decompose to create free radicals that promote polymerization to form an essentially cross-linked unsaturated polyester. Other candidate encapsulates could include non self-condensing epoxies; and isocyanate-containing resins which will polymerize in the presence of water. Alternatively isocyanate-containing resins may be encapsulated and suitable amines added to and incorporated in the insulation so that release of the isocyanate and exposure to the amine would promote the formation of polyurethane. Also, provided adequate physical access can be provided, ultraviolet (UV) light exposure may be used to initiate or trigger polymerization either with or without an ultraviolet light initiator. Acrylic monomers and prepolymers are the most likely classes of resin for use with ultraviolet light polymerization.

Electric motors are generally rated on the basis of the maximum sustainable conductor temperature consistent with a 20,000 hour operating life: for example a class B motor is rated for 130° C.; a class F for 155° C.; and class H is rated for 180° C. The temperature limit is set by the temperature resistance of the insulating coating on the winding and thus a variety of insulating coatings are in common use depending on the motor rating. Coatings may not be homogeneous and composite coatings comprising a thermally-resistant core material overlaid with a layer with good mechanical properties, frequently nylon, are well-known. Some exemplary coatings are: for class F, polyurethane or polyurethane-nylon; and, for class H, polyester-nylon. The insulation layer is thin, in part because the use of such thin coatings, 0.001 to 0.010 inches (about 0.025 to 0.25 millimeters) is typical, imposes minimal restriction on the number of conductors which can physically occupy the available volume.

Coatings may be applied using a variety of approaches which include: applying a solution of monomer or polymer dissolved in appropriate solvent followed by high temperature exposure to evaporate the solvent and promote polymerization or further cross-linking; extruding and applying a flowable resin material in an extrusion die; and electrodeposition of heat-flowable and curable resins. None of these approaches will induce significant shear loads in the insulation and thus all of the approaches are compatible with the introduction of microcapsules.

Filled microcapsules may be fabricated using a number of approaches. Filled polymer (shell) microcapsules in a range of sizes are readily formed, for example by interfacial polymerization particularly, as in this application, when the microcapsules are to be charged with a hydrophobic compound. A multifunctional monomer is added to and dissolved in the liquid core or material to be encapsulated. Typically this will be a multifunctional isocyanate but, depending on the surface coating desired, other monomers or combinations of monomers may be employed. The core, and associated multifunctional monomer, is then dispersed to the desired drop size in an aqueous phase containing a dispersing agent, whereupon a co-reactant, generally a multifunctional amine, is added to the aqueous phase. The reaction of the amine and the isocyanate at the droplet aqueous phase interface results in a rapid polymerization reaction at the interface which generates a polyurea capsule shell.

A polymer capsule shell may be beneficial in that it may, under elevated temperature, or in the presence of a solvent, chemically bond with the insulating coating. For the cited exemplary coatings, the encapsulated shells should adhere well to the coatings. For example, urethane microcapsule shells will adhere well to the urethane coating. Also since many urethanes also comprise polyesters, the urethane shells may also adhere well to the polyester coating. Epoxy shells may also be expected to bond well with polyester coatings. Further urethanes have been suggested as adhesives for polyamide-imide materials, so reasonable adhesion may be anticipated in these systems also. The formation of a strong bond between coating and capsule shell is clearly desirable in promoting efficient stress transfer between coating and capsule. However, under aggressive conditions, the capsule shell may be dissolved away and release the capsule contents during coating manufacture rendering them ineffective in enhancing local dielectric strength in the event of damage to the insulating film.

An alternative approach is to use glass as the encapsulating material. The use of glass may also be beneficial in imparting greater shell strength to the capsule rendering it more tolerant of shear loads imparted during processing. A suitable low temperature process for glass encapsulation is to use a sol-gel process which involves polycondensation and hydrolysis of silica alkoxides such as tetramethylorthosilicate —$Si(OCH_3)_4$— to make transparent oxide glasses. For example, addition of tetramethylorthosilicate in combination with hydrochloric acid as a catalyst to an aqueous emulsion of any of the hydrophobic polymerizable compounds previously described, linseed oil, tall oil, isocyanate and epoxy, will promote formation of silica-encapsulated microcapsules of these compounds. Following aging, removal of excess solvent and drying, filled silica microcapsules may be obtained.

A characteristic of the sol gel process is that the microcapsule shells contain very fine pores of the order of 10 nanometers in diameter which may promote slow release of the microcapsule contents. Thus for at least some of the candidate encapsulants it is preferred to follow a two-stage encapsulation process by first generating continuous polymer shell through, for example, the interfacial polymerization process described previously followed by application of a second, silica shell for strength.

The silica shell, in addition to contributing strength to the microcapsule may also promote adhesion to the insulating coating. The fine porosity characteristic of the silica shells may enable at least partial infiltration of the magnet wire insulation materials into the pores and promote subsequent attachment and mechanical interaction between the microcapsule and the magnet wire insulation. This mechanical interaction will also be effective in transmitting stress from the insulation to the micro-particle and rupturing the micro-particle for release of its contents when required.

It will be appreciated that the rupture strength of the microcapsules should be comparable to, but less than, the rupture strength of the insulating layer. Clearly rupture of the insulation without rupture of the capsule and release of its remedial contents will be ineffective and thus the capsule strength should not exceed the insulation rupture strength. Conversely as FIGS. 2 and 3 make clear, the magnitude of the deformation experienced by the conductor is strongly location dependent. For example, by reference to FIG. 2, the bend at location 15 is highly stressed; the bends are locations 17 are more lightly stressed and the bulk of hairpin 20 has undergone no more than the minimal deformation attendant on being coiled and uncoiled. Release and polymerization of the encapsulate under low stresses when the insulating capabilities of the insulating layer are basically intact would pre-empt subsequent release and polymerization if the conductor were subjected to yet higher stresses and thereby render the encapsulate ineffective. Thus the rupture strength of the capsule shell should be based on the strength of the insulating film and adjusted accordingly, for example by choice of shell composition and its thickness, through control of the encapsulation conditions.

All three commonly-used insulation application processes: coating with dissolved insulation followed by accelerated solvent evaporation and cross-linking at high temperature; extrusion of thermally-softened flowable insulation; and powder coating followed by powder consolidation and flow all employ drying and/or curing temperatures approaching 700° F. Depending on the process used, the temperature of wire and insulation may be less than this temperature but the insulation will be subject to some significant thermal excursions. Thus any microcapsules which are incorporated in the insulation will likewise be exposed to elevated temperatures and these may be sufficient to volatilize the capsule contents and generate significant internal pressure. Thus, for this reason also it will be important to control the capsule shell strength to ensure that capsule rupture does not occur during wire processing.

An appreciable fraction (preferably no less than about 10 and more preferably greater than about 20 percent by volume) of microcapsules is preferred in order to achieve a reasonable remedial insulating film build. Most preferably the largest volume fraction of microcapsules should be employed consistent with processing requirements. Since the viscosity of fluids with solid dispersions increases quite rapidly with increasing volume fraction as the volume fraction approaches 60 percent, a practical limit may be achieved at about 50 percent by volume of microcapsules.

The role of the microcapsule additions is illustrated by consideration of FIG. 7 which shows, in fragmentary sectional view, a schematic representation of a partial V-shaped crack, formed, for example, by bending, which has encountered a filled microcapsule as it propagates from the surface. Thus crack 70 has partially propagated through insulating layer 52 before encountering one of the filled microcapsules 56 and rupturing it to create microcapsule shell fragments 56' while releasing its contents 58. It will be appreciated that the view shown is a sectional view and that crack 70 will extend out of and into the plane of the paper. Thus, in the section shown in FIG. 7 and in other sections where the propagating crack path intersects a microcapsule, the relatively large radius microcapsule will be effective in blunting the crack. However, other regions, such as those above and below the plane of the paper in FIG. 7 may lack appropriately-positioned microcapsules.

In the absence of such microcapsules the crack may be able to propagate entirely through insulating layer 52 to the conductor 50 as shown at 70' in FIG. 8. However, once released, some of the fluid contents 58 derived from the fractured microcapsule of FIG. 7 may flow or be conveyed by capillary action along the extent of the crack to at least partially fill the entire length of the crack. Fluid 58 will subsequently polymerize to form an insulating layer 58' and remediate the dielectric properties of the insulating layer 52. In FIG. 7 a portion of the, now-polymerized fractured microcapsule contents 58' are shown retained within fractured microcapsule walls 56'. However as shown at FIG. 8 polymerized layer 58' derived from polymerizable fluid 58 is effective in reinstating at least some of the dielectric properties of insulating layer 52 as it partially fills crack 70'.

The size of the microcapsules is preferably less than but comparable to the thickness of the insulating layer. The flow characteristics of the insulating layer are determined by the volume fraction of microcapsules. However, the thickness of the remedial insulating layer is determined by the volume of polymerizable material contained within the capsules. Thus it is preferred that the proportion of microcapsule volume attributable to the capsule shell be minimized and thus that the capsule size be as large as possible consistent with its complete accommodation in the insulating layer.

As noted previously, a variety of polymerizable materials may be contained within the microcapsule. It is however preferred that the polymer formed from the polymerizable material have a sufficiently high dielectric constant to appropriately insulate the electrical device. Further it is preferred that the polymerizable material have low viscosity so that it may flow readily along any crack and cover the full length of any exposed insulator. For example consideration of FIG. 2 makes clear that a rupture in the insulation resulting from the high bending strain at location 15 would extend across the thickness of the hairpin. The crack would thus encompass regions containing frangible microcapsules as shown at FIG. 7 and regions where microcapsules are absent as indicated at 'A' in FIG. 5 and as shown in FIG. 8 Additionally the rate of polymerization of the polymerizable material should be sufficiently slow as to enable flow along the crack, but sufficiently rapid that the dielectric properties of the insulating layer are promptly re-established after breach of the insulating layer. And finally the polymerizable material should preferably wet at least the conductor and the resulting polymer and will preferably develop an adherent bond with either the insulating layer or the conductor, or, more preferably, with both.

A first exemplary category of polymerizable materials is the category of 'drying oils' which include tall oil, linseed oil, tung oil, poppy seed oil, perilla oil, and walnut oil. These 'drying' oils undergo polymerization as a result of autoxidation, the addition of oxygen to an organic compound. Thus micro-encapsulated 'drying oils', lacking oxygen, will be unreactive but on rupture of the microcapsule and exposure to oxygen (air), the oxygen will insert itself into C—H bonds adjacent to double bonds within these unsaturated fatty acids. The resulting hydroperoxides are susceptible to decomposition leading to the formation of free radicals which generate crosslinking reactions which will form bonds between neighboring fatty acid chains to produce a polymer network generally comprising a crosslinked unsaturated polyester.

A second exemplary category of polymerizable materials is isocyanate-containing resins (generally referred to as isocyanates). These are not generally self-condensing and so may be stably micro-encapsulated. Also blocked isocyanates may be used. These materials unblock and become active through a thermal reaction. Thus, once released, a short time at temperature would unblock them. However, when the capsule is ruptured and the isocyanate is released it will react with water or atmospheric moisture to form polyurethane and carbon dioxide, which can act as a blowing agent to produce polyurethane foam. Alternatively if an amine can be incorporated into the insulating layer the amine and isocyanate can react, at a rate moderated by the rate of diffusion of the amine, to form polyurea.

A third exemplary category of polymerizable materials are epoxide resins or other compounds which polymerize through reaction with a second compound. Examples would be, as indicated above, isocyanates, epoxides, unsaturated polyesters, etc. These, when reacted with appropriate complementary reactants will form polyurea, polyurethane polymers in the case of the isocyanate containing resins; polyethers in the case of the epoxide resins (also referred to as epoxides); and crosslinked polyesters in the case of the unsaturated polyesters. The second reactive species which could preferably include multifunctional amines or alcohols in the case of isocyanate-containing or epoxide-containing resins or an oxidation catalyst in the case of the unsaturated polyester may be dispersed in the insulating layer, either as solids or as microencapsulated liquids.

Polymerization may be promoted by heat or by exposure to ultraviolet (UV) light. Thus, in systems like catalyzed acrylic resins where self-condensation is not a concern, repeated and accelerated polymerization procedures might be considered. For example in the hairpin motor construction of FIGS. 2-4, a first polymerization might be promoted or accelerated after the hairpins are bent by exposing them to a UV light. Then after insertion into the motor element a second polymerization event might be promoted by a second UV light exposure before final motor assembly. Provided, as in this example, UV light exposure would not trigger polymerization in the encapsulated material the remaining unactivated encapsulates would still be available to remediate any insulation deficiency which might develop in service.

Alternatively, exposure to a mildly-elevated temperature, for example about 100° C., would be effective in promoting polymerization although higher temperatures would promote a more rapid reaction rate and promote more complete polymerization. For best results a thermal initiator, a free radical generating peroxide, for example benzoyl peroxide, or a catalyst, for example ferric oxide may be incorporated in the insulating coating. These additions would also be effective in accelerating thermally-driven polymerization of the contents of any ruptured microcapsules. Thus exposure to such temperature at any desired step in the motor manufacturing process would be effective in ensuring polymerization of the microcapsule contents and remediating any deficiencies in the insulating properties of the coating prior to the motors being placed in service. Since the service temperatures of electric motor windings routinely exceed 100° C., polymerization of the microcapsule contents and remediation of any in-service insulation failure will also occur promptly.

The description herein is merely exemplary in nature and, thus, variations that do not depart from the essentials of that which is described are intended to be within the scope of the disclosure. Such variations are therefore not to be regarded as a departure from the spirit and scope of the disclosure.

The invention claimed is:

1. A method of forming a self-healing electrical insulation coating on a length of magnet wire for use in an electrical device, the magnet wire being intended to be shaped and placed on a supporting element of the device and having a surface to be located against a device surface along the length of magnet wire or against the surface of another magnet wire, the method comprising;

providing each magnet wire with a single layer of an electrically insulating material as a continuous electrical insulation layer coextensive with the surface of the magnet wire, the insulating material further comprising a substantially uniform dispersion of capsules of an electrical insulation precursor material, the electrical insulation precursor material being polymerizable to an electrical insulator following exposure to a polymerization initiator, the capsules being smaller than the thickness of the insulating layer and of a quantity for releasing electrical insulation precursor material where a crack may be subsequently formed in a portion of the insulation layer; and, thereafter, shaping the magnet wire for placement in the electrical device, the shaping causing a mechanical stress at a location in the insulation layer, the capsules being composed to break and release precursor material at a stress location at which an electrical resistance-reducing crack is formed in the insulation layer, reducing the electrical resistance of the insulating material at such location; the released precursor being polymerized at crack locations by a polymerization initiator after the magnet wire has been placed in the electrical device and before the electrical device is approved for use.

2. The method of claim 1 wherein the electrically insulating material is applied as a polymer solution dissolved in a suitable solvent and, after application, is processed by exposure to elevated temperatures suitable for evaporation of the solvent and for promoting further crosslinking of the polymer.

3. The method of claim 1 wherein the capsules are formed by a process comprising interfacial polymerization.

4. The method of claim 1 wherein the capsules are formed by a process comprising a sol gel reaction.

5. The method of claim 1 wherein the electrical insulator precursor material comprises a drying oil.

6. The method of claim 5 wherein the drying oil is one of the group consisting of tall oil, linseed oil, tung oil, poppy seed oil, perilla oil and walnut oil.

7. The method of claim 1 wherein the electrical insulator precursor material contains isocyanate reactive groups.

8. The method of claim 1 wherein the amount of capsules containing electrical insulator precursor material in the insulation layer is at least 10 percent by volume.

9. A method as recited in claim 1 in which the precursor material is exposed to a polymerization initiator to convert the released precursor material to electrically insulating material.

10. A method as recited in claim 9 in which the polymerization initiator is one of the group consisting of ultraviolet light, a temperature of about 100° C., water, water vapor and an oxygen-containing atmosphere.

11. The method of forming a self-healing electrical insulation coating on a length of magnet wire for use in an electrical device recited in claim 1 in which the electrical device is one of the group consisting of coils, solenoids, transformers, generators and motors.

* * * * *